United States Patent [19]
Alpers

[11] 3,878,525
[45] Apr. 15, 1975

[54] FREQUENCY JUMPING CW RADAR

[75] Inventor: Frederick C. Alpers, Riverside, Calif.

[73] Assignee: The United States of America as represented by the Secretary of the Navy, Washington, D.C.

[22] Filed: Aug. 3, 1965

[21] Appl. No.: 477,674

[52] U.S. Cl. .......... 343/14; 343/17.2 PC; 343/17.5; 343/18 E
[51] Int. Cl. .............................................. G01s 9/24
[58] Field of Search ....... 343/14, 17.1 R, 18 E, 17.5

[56] References Cited
UNITED STATES PATENTS

| | | | |
|---|---|---|---|
| 3,039,092 | 6/1962 | Rychlik | 343/17.1 X |
| 3,163,862 | 12/1964 | Jenny | 343/17.1 |
| 3,179,935 | 4/1965 | Blass | 343/14 |
| 3,217,324 | 11/1965 | Adamsbaum et al. | 343/17.1 |

*Primary Examiner*—T. H. Tubbesing
*Attorney, Agent, or Firm*—Richard S. Sciascia; J. M. St. Amand; T. M. Phillips

EXEMPLARY CLAIM

1. In a frequency jumping radar system, the combination comprising:
   a. a square wave generator for generating square wave output signals,
   b. a sweep generator having a first input coupled to the output of said square wave generator, a second input and an output for generating a sweep voltage varying periodically in response to the change in polarity of said square wave signal,
   c. an oscillator having an input coupled to the output of said sweep generator and an output and generating a swept frequency signal in response to the output signal from said sweep generator, the second sweep generator input being coupled to said oscillator output,
   d. a random pulse generator for generating random pulses,
   e. a ring counter having a first input coupled to the output of said square wave generator, a second input coupled to the output of said random pulse generator and having an output,
   f. a frequency control section including a source of multiple signals each of a different frequency,
   g. mixer means having a first input coupled to the output of said swept oscillator and having a second input, and an output,
   h. first electronic switch means coupled between said multiple signal source and the second input to said mixer means and being coupled to said ring counter for randomly coupling signals of a given frequency to said mixer means for the duration of said square wave signal,
   i. antenna transmitting means coupled to the output of said mixer means for transmitting the output signals from said mixer in the direction of a selected target,
   j. delay circuit means for generating a delayed reference signal,
   k. antenna receiving means for receiving reflected signals from the selected target; and
   l. receiver circuit means coupled to said delay circuit means and said antenna receiving means for deriving range and velocity information of the selected target.

3 Claims, 3 Drawing Figures

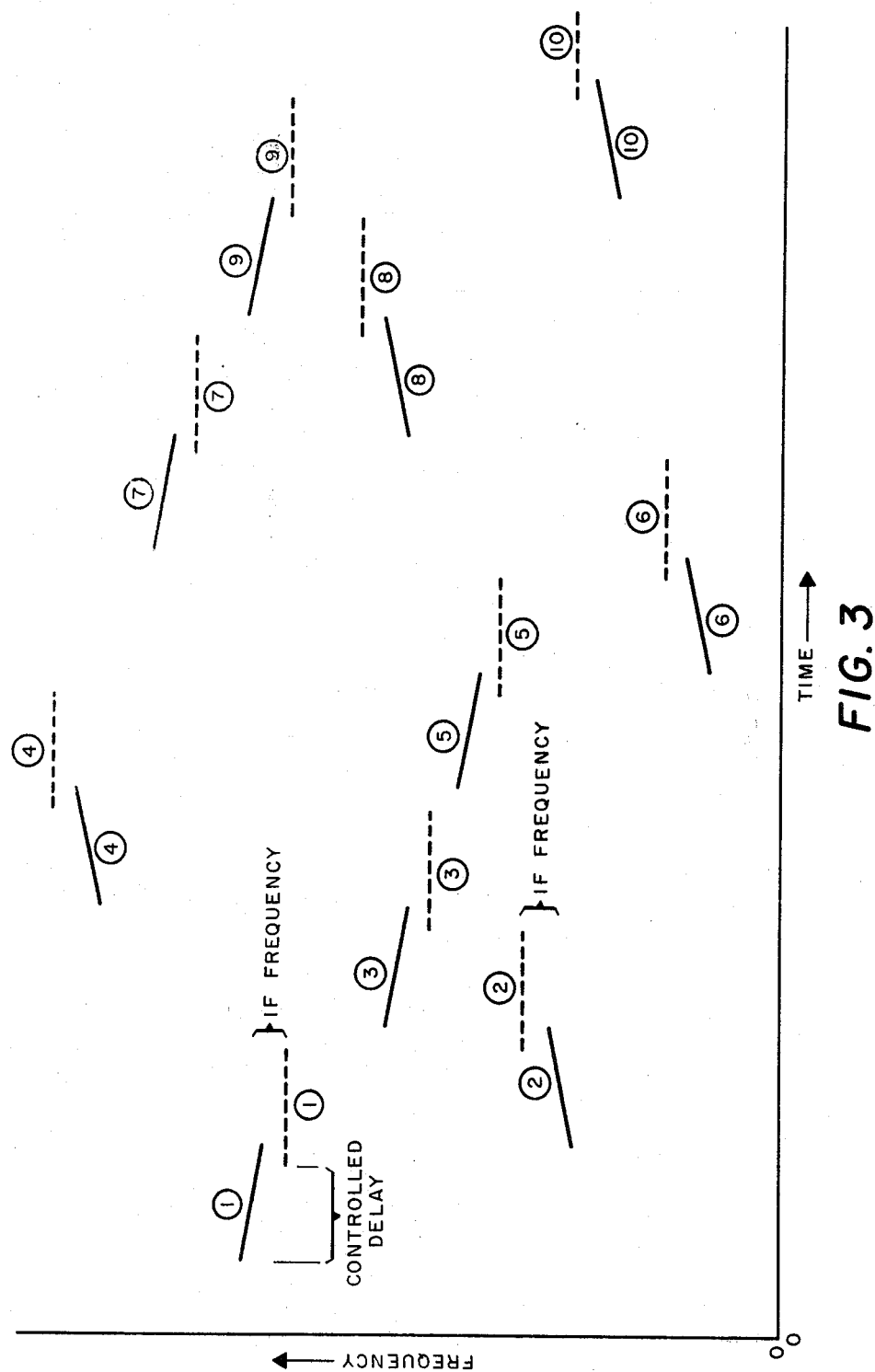

FREQUENCY JUMPING CW RADAR

The invention herein described may be manufactured and used by or for the Government of the United States of America for governmental purposes without the payment of any royalties thereon or therefor.

The present invention relates to frequency jumping CW radar systems and more particularly to frequency jumping CW radar systems having a high degree of target selectivity and counter-countermeasure capability and having features desirable for use with semi-actively guided surface-to-air missiles.

In certain radar applications, it is desirable to detect and track an incoming target signal amid considerable clutter signals representing sea return, terrain objects, etc., which are of no interest. Various pulse, pulse doppler, continuous wave (CW), and frequency modulated CW radars incorporating moving target indicator (MTI) or velocity gating circuitry are designed to sort out such a moving target signal. These suffer from the disadvantages of not providing the necessary counter-countermeasure and are of complex design.

The present invention overcomes the above disadvantages of prior known radar systems by providing a frequency jumping CW radar divided into three sections: the transmitter, frequency control and receiver. The transmitter section includes means for the generating and control of a signal with swept frequency, means for adding to this signal a randomly jumping signal from the frequency control section, a radar frequency (RF) power amplifier to amplify the composite signal to a power level suitable for radar transmission, and a radar antenna. The frequency control section contains various oscillators to produce RF signals at low power levels, and the necessary control circuitry for switching and mixing these signals to provide the RF signals for the frequency jumping. The receiver section contains an antenna of suitable design, a mixer for heterodyning, an intermediate frequency amplifier, a pulse compression filter, and special circuitry for processing the resultant signals and extracting range and velocity information with respect to a selected target.

An object of the present invention is to provide a radar which overcomes the counter-countermeasure and high degree of target selectivity problems of known radar systems.

Another object is to provide a frequency jumping radar which has good counter-counter-measure characteristics.

A further object of the invention is to provide a frequency jumping radar which has a high degree of target selectivity.

Another object is to provide means for abruptly changing or "jumping" the transmission frequency of a CW radar while maintaining proper tuning for superheterodyne reception.

Another object is the formulation of short pulses, suitable for target range measurement and range discrimination, in a radar which is continuously transmitting.

Other objects and many of the attendant advantages of this invention will become readily appreciated as the same becomes better understood by reference to the following detailed description when considered in connection with the accompanying drawings wherein:

FIG. 3 is a graph showing typical sequence of transmitter and local oscillator frequencies for the frequency jumping radar of FIG. 1.

Figure 1:
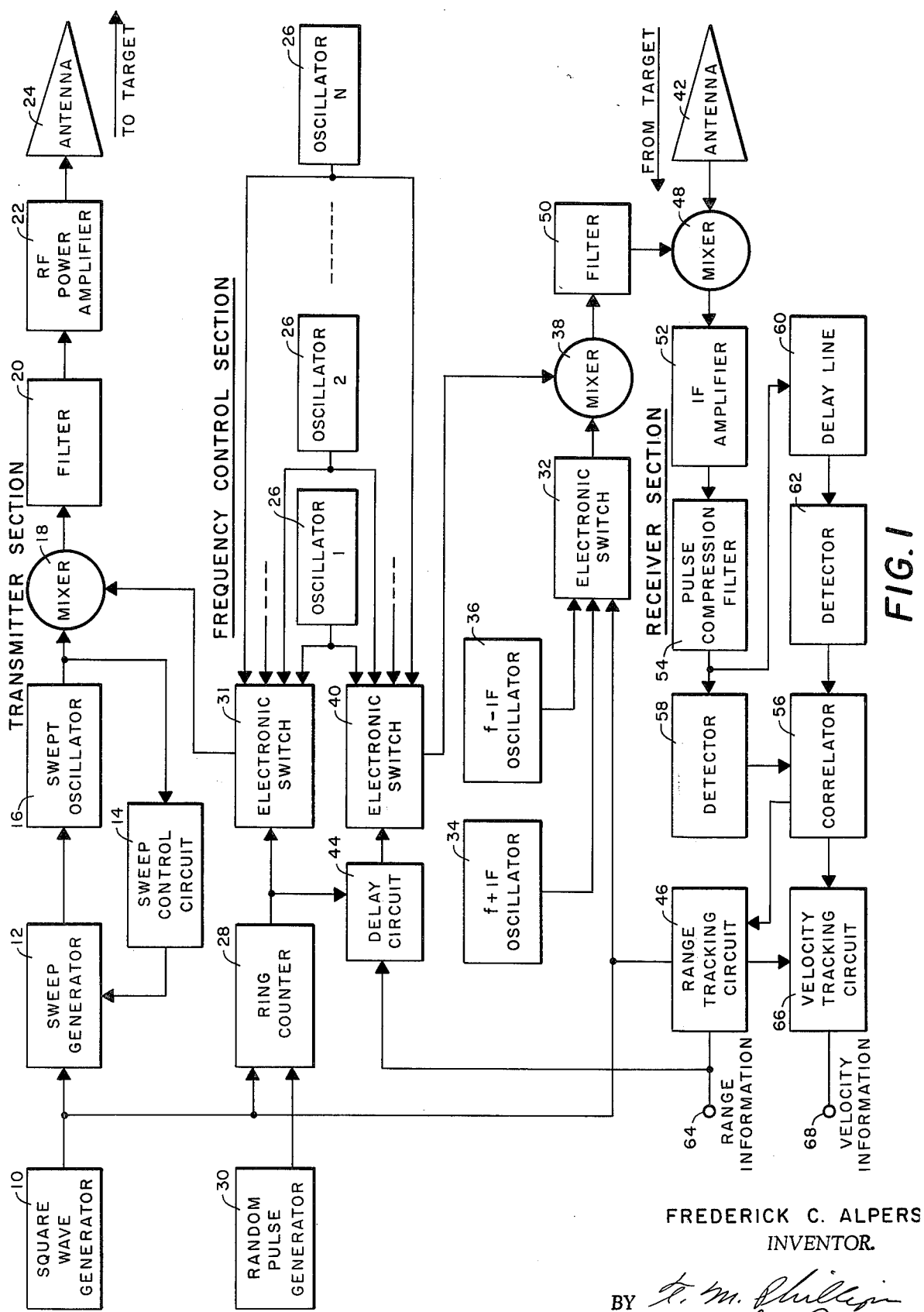
FIG. 1 is a block diagram of a frequency jumping radar embodying the invention.

Referring now to the drawings, there is shown in FIG. 1 the radar system embodying the invention divided into three sections: transmitter, frequency control and receiver. The transmitter section includes square wave generator 10 driving a sweep generator 12 whose frequency is controlled by a sweep control circuit 14 for controlling swept oscillator 16 to provide a signal with a swept frequency. The swept frequency signal is added in mixer 18 with a randomly jumping signal from the frequency control section. The combined signal is fed through filter 20 to RF power amplifier 22 to amplify the composite signal to a power level suitable for radar transmission from any suitable radar antenna 24.

The frequency control section contains a plurality of oscillators 26 to produce RF signals at low power levels, and also the necessary control circuitry for switching and mixing these signals in a manner to be described below.

The output signal at antenna 24 changes abruptly or "jumps" frequency at intervals. These intervals are controlled by square wave generator 10 in the following manner. During the positive portion of the square wave, sweep generator 12 causes swept oscillator to change frequency slowly in one direction, while during the negative portion the sweep is reversed and proceeds slowly in the opposite direction. Swept oscillator 16 is preferably a low power device operating in an RF band (e.g., S-band) which differs from the frequency band which is transmitted at antenna 24 (e.g., X-band). Sweep control circuit 14 utilizes the output of swept oscillator 16 both to maintain its output at the desired center frequency and to maintain the extent of frequency sweep about the center frequency at approximately 500 kc.

The output signal from swept oscillator 16 is fed to mixer 18 where it is added to a signal from the frequency control section which preferably is at low power level and is at a frequency (e.g., C-band) which would typically be different from the frequency band of swept oscillator 16. The outputs from mixer 18 are the sum and difference frequencies of the two inputs; either of these may be used as the transmitted signal frequency (in the example selected, S-band plus C-band equals X-band, which is the desired radar transmitting frequency). RF filter 20 coupled to the output of mixer 18 selects the particular band desired and rejects all others. The signal at the selected frequency band is amplified in RF power amplifier 22 which may comprise several stages and is transmitted in the direction of a target by antenna 24.

The square wave output signal from square wave generator 10 is coupled as input to ring counter 28 where each change in direction of the square wave signal will change conduction in the ring from one segment to another. Random pulses from random pulse generator 30 are also fed to ring counter 28 which will cause the progression of conduction in the ring to proceed in a random manner rather than shifting from segment to segment in regular sequence. Ring counter 28 will have changes in its output twice during each square wave input, but will maintain a steady output between these changes. The output will be indicative of which segment of the ring is in conduction at a given time.

The output of ring counter 28 serves to control the positioning of multiposition electronic switch 31. Inputs to electronic switch 31 are provided by a plurality of RF signals (C-band in the example used) generated by a plurality of RF oscillators 26. Each of oscillators 26 is preferably a low power, fixed device which operates at a frequency different from the operating frequencies of the other oscillators supplying RF signals to electronic switch 31. The action of ring counter 28 through electronic switch 31 is the random selecting of the RF signal to be fed to mixer 18 of the transmitting section during each interval.

Transmission frequencies, which result from this random selection of frequencies within the frequency control section plus the frequency change within each interval as a result of the action of swept oscillator 16 is shown in FIG. 3. For the first transmitter interval (indicated by solid line 1) the frequency sweep is in the direction of decreasing frequency. During the second interval (solid line 2), where the center frequency has changed randomly through selection of a different oscillator 26 in the frequency control section than was involved during the first interval, the frequency sweep is in the increasing frequency direction. During transmission interval three, still another center frequency is involved and the sweep is again in a decreasing direction. This process continues through succeeding intervals, and shown at transmission interval eight the same center frequency happens to have been selected as was selected for transmission interval three; but in this case (it being an even-number interval) the direction of sweep is reversed. During interval nine, the same frequency as used in the first interval has been randomly selected, and in this case the sweep is in the same direction, so that transmission nine happens to be a duplicate of the first transmission.

The output of square wave generator 10 is fed to a two-position electronic switch 32 for selecting either the output of $f +$ IF oscillator 34 or of $f -$ IF oscillator 36. Each of oscillators 34 and 36 operates at approximately the frequency of swept oscillator 16. Oscillator 34 provides an RF signal which is greater than the center frequency of swept oscillator 16 by an amount equal to the intermediate frequency used for heterodyning purposes in the receiver section. Similarly oscillator 36 provides an RF signal which is less than the center frequency of swept oscillator 16 by this same amount. The output signal of oscillator 34 is selected by electronic switch 32 during the positive portion of the square wave from square wave generator 10 while the output of oscillator 36 is selected during the negative portion. The selected signal (S-band in the example) is fed to mixer 38 where it is mixed with a signal selected by electronic switch 40 from one of oscillators 26 of a different frequency (C-band) in order to obtain a signal suitable as the local oscillator signal for the receiver section. To assure that the local oscillator signal jumps frequency in the proper relationship to the reflected transmitted signal as received through antenna 42, electronic switch 40 selects RF signals from oscillators 26 on the same random basis as was used for transmission. This random basis is that effected by random pulse generator 30 and ring counter 28, but it is utilized following a time delay introduced by delay circuit 44. The amount of delay introduced is controlled by the output of range tracking circuit 46 which is proportional to the range of the target being tracked. When no target is being tracked, delay circuit 44 may be adjusted to provide a delay that will correspond either with the range at which detection of an incoming target is most probable, or the range selected as a guard range of an associated defense missile system.

The manner of derivation of the local oscillator signal (represented by broken lines) is shown in FIG. 3. Following each transmitter frequency sweep (solid lines) by a controlled delay there is an interval of unsweeping local oscillator signal (broken lines) that differs in frequency from the center frequency of the associated transmitter signal by an amount equal to the IF frequency. On successive transmitter intervals the local oscillator signal (broken lines) changes from a frequency above the transmitter center frequency to a frequency below the frequency of the transmitter (solid lines) in synchronism with the change in transmitter sweeping from an increasing direction to a decreasing direction.

In the receiver section, echo signals from a target (not shown) and other objects in the beam of the radar are received at receiving antenna 42. If the target is an object coming toward antenna 42 while other objects within the beam are stationary, the doppler principle will cause the target signal to be at a slightly higher frequency than signals from other objects. Except for slight differences that occur at the ends of frequency sweep intervals, the effect of the target return being at a higher frequency is to make it to appear to come from an object at a shorter range when the transmitter sweep is in a direction of increasing frequency, and to appear to come from longer range when the transmitter sweep is in a decreasing direction. While stationary objects appear to remain at a fixed range as the sweep direction of the transmitter is reversed, the signal from a moving target therefore alternates its position in synchronism with this reversal. If the signal is reflected from an outgoing target rather than an incoming one, the doppler principle will cause a lower frequency signal than from a stationary object, and this will in turn cause an apparent range change which is opposite in direction to that caused by the higher frequency signal. This makes it possible to discriminate between signals received from incoming and outgoing objects as well as to separate moving targets from stationary targets.

Signals received at antenna 42 are fed to mixer 48 and superheterodyned with the local oscillator signal fed from mixer 38 through filter 50. The resultant intermediate frequency signals are amplified in IF amplifier 52 which should have a bandwidth approximately equal to that of the frequency sweep in the transmitter section (500 kc in the example). The amplified IF signals are fed to a pulse compression filter 54 which may be of the type used in frequency modulated radars ("chirp" radars). The function of filter 54 is to delay each portion of an incoming signal by an amount which is dependent upon the exact frequency of that particular portion of the signal. The result produced by compression filter 54 is that echo signals having a length equal to the time duration of the transmission interval are each compressed to a short pulse of IF-energy, and signals which are overlapping in time at the input are separated into shorter and discrete pulses (e.g., echos arising from a 100-μsec transmission interval might be compressed by a ratio of fifty into two-μsec duration output pulses). The IF signals at the output of compression filter 54 appear much the same as would signals from a standard pulse radar, with leakage of the transmitter signal into the receiver appearing at a time equivalent to zero range, and echo signals from objects within the reception beam each appearing at a time dependent upon the range of that object from the radar and the velocity of light. In the present system signals associated with objects that are moving toward or away from the radar will be displaced from their normal range position on the time axis by an amount dependent upon this velocity (e.g., with transmission signals at X-band and with an interval of 100 $\mu$sec compressed to give a pulse of two $\mu$sec at the output of filter 54, the resultant signal will move ahead or behind one $\mu$sec in time for each 150 knots of velocity of the associated object).

The signals at the output of pulse compression filter 54 pass through two channels to a correlator unit 56. In one channel the IF signals are detected in detector 58 to provide video signals as a first input to correlator 56. In the other channel the IF signals pass through a delay line 60 which delays the signal by an amount that is equal to one transmitter sweep interval. The delayed signal is then detected in detector 62 to provide a second video input to correlator 56. Control means should be provided between square wave generator 10 and delay line 60 to keep the transmitting interval and the delay equal. Delay line 60 may be of the ultrasonic type. There are then signals associated with two succeeding transmitter sweep intervals present at the input of correlator 56 at all times, and signals received when the transmitter sweeps in one direction may be directly compared with signals received during a sweep in the opposite direction. By subtraction, signals associated with stationary objects with respect to the radar are eliminated, and only signals which are associated with moving objects and which are displaced in time with respect to their counterparts in the opposite channel will remain.

Signals representing moving targets are fed to range tracking circuit 46 where one or both of them may be selected and tracked by techniques well known in the art. Range tracking circuit 46 supplies target range information to delay circuit 44 and to range information output terminal 64.

Signals representing moving targets are fed to velocity tracking circuit 66 where target velocity may be measured coincidently with each set of target pulses received at the input of correlator 56. A gated pulse is fed from range tracking circuit 46 to make sure that the velocity measurement is made only for the target being range tracked. Velocity can be determined by measurement of the delay between the two pulses remaining in the correlator 56 output after the subtraction process. If two moving targets are present and their range and velocities are such that the pulses are not readily separated by means of the range tracking input to velocity tracking circuit 66, certain radar parametric values may be changed, as for example, the pulse compression filter 54 may be changed to one having a different compression ratio. The output of velocity tracking circuit appears at terminal 68.

Figure 2:
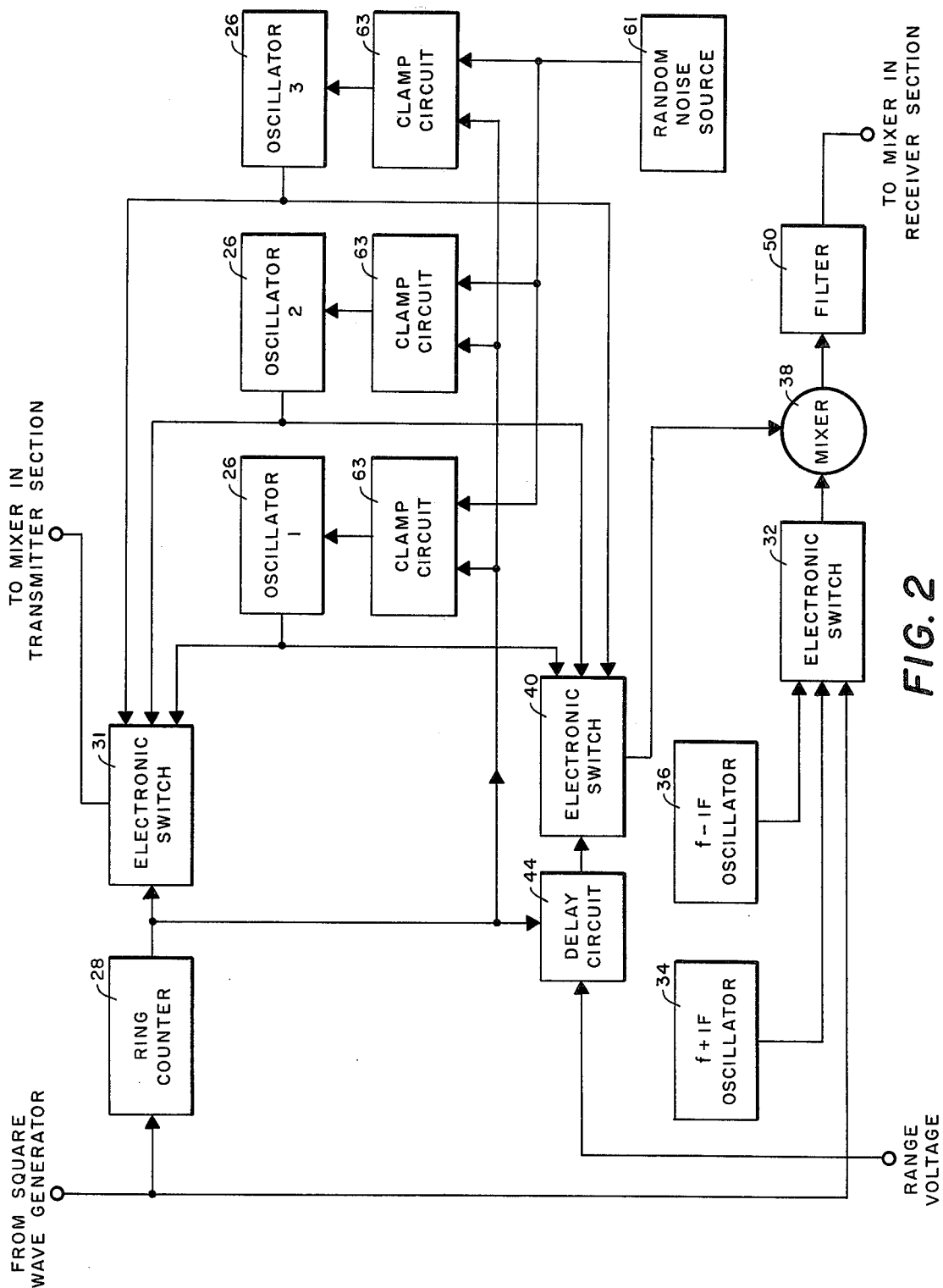
FIG. 2 is a block diagram showing an alternate form of frequency control for the system of FIG. 1.

FIG. 2 shows an alternate form of the frequency control section of FIG. 1 where oscillators 26 are electronically tuned by a random noise source 61, the output signal of which is clamped by clamp circuits 63 at times determined by the output signal from ring counter 28. The clamping action is such that electronic tuning of only one of the oscillator 26 is permitted at the time of each change in conduction in ring counter 28, and the particular oscillator 26 which is tuned at a given time is determined by which segment of the ring is in conduction at that instant. Counter 28 operates in the regular sequence instead of the random sequence as in FIG. 1. The result is therefore that each of the oscillators 26 is tuned in regular sequence, and each is clamped at this particular randomly derived tuning until conduction has cycled completely around ring counter 28 and the time to retune that particular oscillator 26 has arrived. While the frequency of a given oscillator is held clamped, the output of ring counter 28 controls electronic switch 31 so that the output of that given oscillator 26 is fed to the transmitter section for the period of time during which the one segment of the ring counter is conducting, and, while the same frequency clamping action continues, the output of ring counter 28 also acts through delay circuit 44 to control electronic switch 40 to cause the output of the same oscillator 26 to be fed to mixer 38. Through this arrangement an appropriately tuned local oscillator signal is derived for use in the receiver section after a time delay determined by the range voltage, and when the transmitter shifts to a new randomly derived frequency supplied by a different oscillator 26, the clamping action and time delay cause an appropriately retuned local oscillator signal to be available when needed.

The alternate form of the frequency control section, although more complex than that shown in FIG. 1, has the advantage that the number of different frequencies available is not limited by the number of oscillators 26. The number of oscillators 26 and clamp circuits 63 required in the alternate form is determined by the period selected for the square wave and by the maximum range at which targets are to be detected and tracked.

I claim:

1. In a frequency jumping radar system, the combination comprising:
    a. a square wave generator for generating square wave output signals,
    b. a sweep generator having a first input coupled to the output of said square wave generator, a second input and an output for generating a sweep voltage varying periodically in response to the change in polarity of said square wave signal,
    c. an oscillator having an input coupled to the output of said sweep generator and an output and generating a swept frequency signal in response to the output signal from said sweep generator, the second sweep generator input being coupled to said oscillator output,
    d. a random pulse generator for generating random pulses,
    e. a ring counter having a first input coupled to the output of said square wave generator, a second input coupled to the output of said random pulse generator and having an output,
    f. a frequency control section including a source of multiple signals each of a different frequency,
    g. mixer means having a first input coupled to the output of said swept oscillator and having a second input, and an output,
    h. first electronic switch means coupled between said multiple signal source and the second input to said mixer means and being coupled to said ring counter for randomly coupling signals of a given frequency to said mixer means for the duration of said square wave signal, i. antenna transmitting means coupled to the output of said mixer means for transmitting the output signals from said mixer in the direction of a selected target, j. delay circuit means for generating a delayed reference signal, k. antenna receiving means for receiving reflected signals from the selected target; and l. receiver circuit means coupled to said delay circuit means and said antenna receiving means for deriving range and velocity information of the selected target.

2. The system of claim 1 wherein said receiver circuit means comprises:

a. mixer circuit means having a first input coupled to said receiving antenna, a second input coupled to said delay circuit means and an output, b. intermediate amplifier means having an input coupled to the output of said mixer circuit means and having an output, c. pulse compression filter means having an input coupled to the output of said intermediate amplifier and an output, d. a first detector coupled to the output of said pulse compression filter means for detecting signals of the intermediate frequency and having an output, e. a delay line coupled to the output of said pulse compression filter for delaying the signal by an amount equal to one transmitter sweep interval and having an output, f. a second detector coupled to the output of said delay line for detecting signals of the intermediate and having an output, g. correlator circuit means having a first input coupled to the output of said first detector and a second input coupled to the output of said second detector for providing first output signals associated with moving targets and second output signals associated with stationary targets.

3. The system of claim 1 wherein the frequency control circuit comprises:

a. a plurality of oscillators each operating at a different frequency and having an input and an output, b. a clamping circuit associated with each of said oscillators each having two inputs and an output coupled to the input of the oscillator with which it is associated, c. a random noise source for generating noise signals having an output coupled to one of said two inputs of each of said clamping circuits, d. a ring counter having an input coupled to the output of said square wave generator and having an out put coupled to the other of said two inputs of each of said clamping circuits, e. first electronic switching means having a first input coupled to the output of said ring counter, a plurality of second inputs each coupled respectively to one of the outputs of each of said plurality of oscillators, and having an output, f. said delay circuit for generating a delayed reference signal having a first input coupled to the output of said ring counter, a second input coupled to the range voltage terminal of the receiver section and an output, g. second electronic switching means having a first input coupled to the output of said delay circuit, a plurality of second inputs each coupled respectively to one of the outputs of each of said plurality of oscillators and an output, h. third electronic switching means having a first input coupled to the output of said square wave generator, a second input coupled to a signal source operating above the intermediate frequency, a third input coupled to a signal source operating below the intermediate frequency and an output, i. mixer means having a first input coupled to the output of said second electronic switching means and a second input coupled to the output of said third electronic switching means for providing a local oscillator signal for said receiver section.

* * * * *